(12) United States Patent
Negre et al.

(10) Patent No.: US 8,734,083 B2
(45) Date of Patent: May 27, 2014

(54) TOOLING DEVICE

(75) Inventors: Bernard Negre, Paris (FR); Gérard Pinchon, Acheres (FR); Gregor Stengel, Karlsruhe (DE); Kuno Hug, Heidelberg (DE); Sven Soetebier, Ladenburg (DE); Wolfgang Waldi, Nussloch-Maisbach (DE)

(73) Assignee: ABB AG, Mannheim (DE)

( * ) Notice: Subject to any disclaimer, the term of this patent is extended or adjusted under 35 U.S.C. 154(b) by 151 days.

(21) Appl. No.: 13/209,114

(22) Filed: Aug. 12, 2011

(65) Prior Publication Data
US 2012/0003073 A1  Jan. 5, 2012

Related U.S. Application Data

(63) Continuation of application No. PCT/EP2009/001444, filed on Feb. 28, 2009.

(51) Int. Cl.
*B25J 9/10* (2006.01)
(52) U.S. Cl.
CPC .............. *B25J 9/1065* (2013.01); *Y10S 414/13* (2013.01)
USPC .......................................... 414/738; 414/917
(58) Field of Classification Search
CPC ...... B25J 9/1065; B25J 9/1623; Y10S 414/13
USPC .......... 414/729, 732, 736, 738, 749.4, 749.5, 414/749.6, 751.1, 917
See application file for complete search history.

(56) References Cited

U.S. PATENT DOCUMENTS

| 6,557,235 | B1 | 5/2003 | Katz et al. |
| 2004/0130085 | A1 | 7/2004 | Lim |
| 2005/0008469 | A1 | 1/2005 | Jung |
| 2007/0233320 | A1* | 10/2007 | Waldmann et al. ........... 700/245 |

FOREIGN PATENT DOCUMENTS

| DE | 10 2004 026455 A1 | 12/2005 |
| EP | 1 839 820 A | 10/2007 |
| ES | 2 220 233 A1 | 12/2004 |
| ES | 2 220 234 A1 | 12/2004 |
| FR | 2 909 300 A1 | 6/2008 |

OTHER PUBLICATIONS

International Search Report (PCT/ISA/210) issued on May 13, 2009, by European Patent Office as the International Searching Authority for International Application No. PCT/EP2009/001444.

* cited by examiner

*Primary Examiner* — Saul Rodriguez
*Assistant Examiner* — Brendan Tighe
(74) *Attorney, Agent, or Firm* — Buchanan Ingersoll & Rooney PC

(57) ABSTRACT

Exemplary embodiments are directed to a tooling device which for connecting to a manipulator. The device includes a base unit and at least two manipulator modules each with a first and a second end. At least one degree of freedom in movement is provided between both ends of each manipulator module. The first end is connected with the base unit and a tool interface is provided at the second end. The tool interfaces are each moveable independently of the other relative to the base unit. At least one manipulator module is linearly moveable on its first end relative to the base unit.

15 Claims, 3 Drawing Sheets

TOOLING DEVICE

RELATED APPLICATIONS

This application claims priority as a continuation application under 35 U.S.C. §120 to PCT/EP2009/001444 filed as an International Application on Feb. 28, 2009 designating the U.S., the entire content of which is hereby incorporated by reference in its entirety

FIELD

The present disclosure relates to a tooling device, such as a tooling device for connecting to a manipulator.

BACKGROUND

It is known that industrial production processes, for example in the automotive industry, are often based on a wide range of different shaped types of workpieces which are to be mounted together. Due to the increasing number of variants of the final product, there is also an increased variety in the types of workpieces to be mounted together.

An industrial production can be realized by using industrial robots for the standardized production processes such as gripping a platform for a car to be mounted from a staple and moving it to an assembly area. Industrial robots can be used as manipulators with, for example 5 to 7 degrees of freedom in movement. The robots can perform programmable movements within their working range that includes, for example, a radius of 3 m around a belonging rotary base.

The industrial robots or other manipulators can require a tooling device mounted thereon for securely gripping a workpiece. To handle the high variety of different shaped types of workpieces—such as platforms for cars—it is either possible to handle each type of workpiece with a dedicated gripper tool or to design the tooling device to be as flexible as possible. The required effort for changing the manipulating tool is reduced therewith.

EP1839820 B1 discloses a manipulating device for the handling of workpieces which is foreseen to be mounted on a robot. The workpieces include several operating modules which are stationary mounted on the same carrier unit on their one side and which provide a mounting interface for a gripper tool on their other side. To increase the flexibility of this manipulating device, each mounting interface can be moveable within the working range of the belonging working module independently of each other.

In known systems the working ranges of the operating modules do not overlap. As a result, there is still a significant restriction in the flexibility of the respective manipulating device.

SUMMARY

An exemplary tooling device for connecting to a manipulator is disclosed. The tooling device includes a base unit and at least two manipulator modules each with a first and a second end, wherein at least one degree of freedom in movement is provided between both ends of each manipulator module, and the first end of each manipulator module is connected with the base unit; a tool interface is provided at the second end of each manipulator module, wherein the tool interfaces are moveable independently each from each other relative to the base unit; wherein at least one manipulator module is linearly moveable on its first end relative to the base unit.

BRIEF DESCRIPTION OF THE DRAWINGS

The present disclosure will now be further explained by means of an exemplary embodiment and with reference to the accompanying drawings, in which.

DETAILED DESCRIPTION

Figure 1:
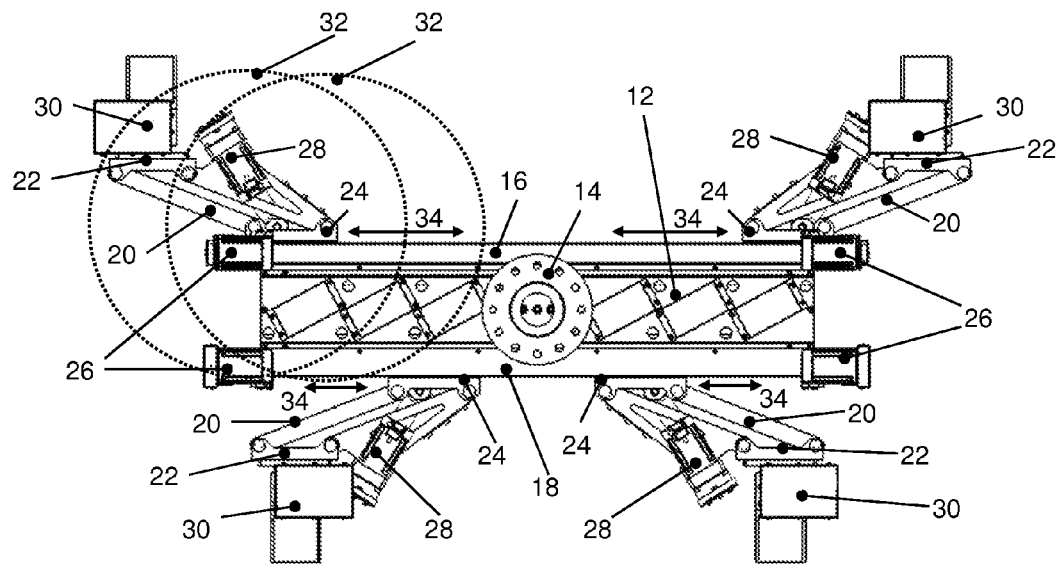
FIG. 1 illustrates a top-view on a first tooling device in accordance with an exemplary embodiment.

Exemplary embodiments of the present disclosure are directed to providing a tooling device with increased flexibility.

These embodiments address the known problems by providing a tooling device having at least one manipulator module that is linearly moveable on its first end relative to the base unit.

Hence it is possible to enlarge the working range of the manipulator module, for example, along the whole longitudinal extension of the base unit of the tooling device. The wording 'linearly moveable' includes any movements along any path even though the path is substantially straight. Since one additional degree of freedom in movement is provided in moving a manipulator module itself, it is possible to reduce the degrees of freedom in movement of a manipulator module by one degree so that its construction requires less effort. A manipulator module can provide one degree of freedom in movement so that the second end with the tool interface is moveable along a circular path around its first end.

Exemplary embodiments of the present disclosure can include constructions of a manipulator module with more than one degree of freedom in movement. Six degrees of freedom in movement of each manipulator module would provide, for example the possibility to reach each point within its linear prolonged working range in each orientation, even though the tooling device itself is not moved.

Considering also the possible degrees of freedom in movement of a gripping tool which can be attached on the tool interface, the specified number of degrees of freedom in movement of a manipulator module can also be decreased whereas the minimum is one.

Also the degree of freedom in movement of the manipulator wherewith the tooling device is connected has influence on the required number of degrees of freedom in movement of the manipulating modules.

In an exemplary embodiment of the present disclosure, actuators are provided for linearly moving the manipulator modules and/or for driving the manipulator modules in at least one degree of freedom in movement. The actuators can include, for example electric motors, pneumatic or hydraulic drives any other suitable actuators as desired, or any combination of suitable actuators of different types as desired.

In another exemplary embodiment of the present disclosure at least one actuator is linearly moveable together with an associated manipulator module relative to the base unit. An actuator as such can drive the associated manipulator module in at least one degree of freedom in movement. The effort for mechanically transmitting the force from the actuator to the associated manipulator module to be driven is thereby reduced. In the case of an electric motor, for example a cable is guided to the actuator of the moveable manipulator module.

In an exemplary embodiment of the present disclosure at least one manipulator module is moveable on a skid along a guide rail which can be a part of the base unit. The skid itself can include plural rollers or floating bearings for improved movement relative to the guide rail which can be an attached part of the base unit. Depending on the construction of the manipulator module, in an exemplary embodiment the skid could be a part of the manipulator module itself.

According to another exemplary embodiment of the present disclosure at least two manipulator modules can be mounted on separate skids on the same guide rail and moveable independently each from each other. As a result, the working ranges of those manipulator modules which are related to the same rail may overlap in a wide area so that the flexibility of the tooling device is increased once more. It is possible, for example to move all those manipulator modules to the same end or to the opposed ends of the guide rail.

In another exemplary embodiment of the present disclosure at least two manipulator modules can be mechanically coupled and driven by a common actuator along a common guide rail. This coupling can be realized by mechanically coupling at least two separate skids, or mounting two independent manipulator modules on the same skid. Coupling the manipulator modules can reduce the types of workpieces to be handled due to a constraint on shape.

Regarding another exemplary embodiment of the present disclosure, at least one actuator can be coupled with a spindle drive and shaft joint, to translate a rotary movement, for example, of an electric motor, into a linear movement which can be specified, for example, for the linear movement of manipulator module along a guide rail.

Based on another embodiment of the present disclosure, the at least one degree of freedom in movement of a manipulator module can be realized by a tiltable truss structure in the shape of a parallelogram which is directly or indirectly connected to the skid. Using such a parallel truss structure the tool interface of the manipulator module is moveable along a circular path around the associated skid. Using this configuration, the orientation of the skid in relation to the tool interface will always be the same.

To increase the stiffness of an exemplary manipulator module of the present disclosure at least two tiltable truss structures in the shape of a parallelogram can be used in a manipulator module each, which are mechanically connected.

Considering also the linear movement of the manipulator module along a guide rail, a tool interface in any XY position on a virtual plane within the working range of the belonging manipulator module. In an exemplary embodiment, a gripper tool can be mounted on the tool interface where the gripper tool itself provides at least one additional degree of freedom in movement in upright direction to the virtual plane. As a result, the gripper tool tip can be adjustable in the XYZ direction. In yet another exemplary embodiment, the moving mechanism can have an orthogonal overlap of three linear degrees of freedom in movement.

According to an exemplary embodiment of the present disclosure, at least two guide rails can be parallel with at least one mounted skid, where guide rails are each moveable independently of each other. The two guide rails can overlap at least along a part of their longitudinal extension. As a result, two parallel guide rails can be arranged in an opposed orientation, such that the working range and the flexibility of the tooling device can be once more increased therewith.

According to another exemplary embodiment of the present disclosure, at least two guide rails in parallel with at least one common moveable mounted skid can be used, where the two guide rails overlap at least along a part of their longitudinal extension. The common skid can be moveable along the overlapping parts of the rails. This arrangement can be useful, for example, to increase the mechanical stability of the tooling device so that higher forces can be applied by the belonging manipulator modules on the workpiece to be handled.

In another exemplary embodiment of the present disclosure, at least two guiding rails with at least one moveable mounted skid each can be nested around a common rail and at least one of those skids is in addition moveable mounted on the common rail, where the working ranges of the skids can overlap. So a variety of highly complex workpieces can be handled by a flexible tooling made of standardized actuator modules with increased stiffness.

According to another exemplary embodiment of the present disclosure, at least two skids or already coupled skids can be coupled together and this coupled arrangement of skids can be driven by one common actuator along the guide rails. As a result, the number of required actuators can be reduced with consideration of the shape of objects to be gripped.

In an exemplary embodiment of the present disclosure, the actual position of a moveable mounted skid on the guide rail and/or the position of a manipulator module and/or the position of a tool interface can be ascertained with a sensor device. As a result, the control of the movements of the tooling device and its manipulator modules can be simplified. The sensor device can be implemented as an impulse counter for a stepping motor which is used as actuator, and a slide resistance or an optical sensor are suitable sensors.

The tooling device according to an exemplary embodiment of the present disclosure is mounted on an industrial robot. An industrial robot is a manipulator with for example six degrees of freedom in movement. So the whole tooling device can be moved by the industrial robot within its working range, for example, in a radius of 3 m around its base, in any orientation. A total of three degrees of freedom in movement of the tooling device including gripper tools mounted thereon is sufficient for a high flexibility of a system with robot and tooling device. In this case, nine degrees of freedom in movement can be provided in total.

In another exemplary embodiment of the present disclosure, the movement of the robot and the movement of the tooling device are controlled by the same controlling device. This arrangement can also include the movement of a gripper tool which can be attached to the tool interface and which can provide an actuator driven within a suitable degree of freedom in movement. The coordination of the overall movements of the whole system can be made easier, as a result.

The problems associated with known systems can be also solved by a method for gripping a workpiece with a tooling device according to the present disclosure, where the manipulator modules are pre-positioned in a pre-tilt position before moving to the final gripping position. The pre-positioning can be done while a robot or other manipulator moves the empty tooling device in direction of the workpiece to be gripped. When the tooling device itself is in its final position relative to the workpiece the required movements of the manipulator modules are low so that the speed of the gripping process can be increased. The pre-tilt position should be chosen so the tooling device with the manipulator modules in pre-tilt position can be moved over the workpiece to be gripped without any collision.

FIG. 1 illustrates a top-view on a first tooling device in accordance with an exemplary embodiment. As shown in FIG. 1, a first tooling device 10 includes two parallel and opposed guide rails 16 and 18 that are attached to a base unit 12 to be connected to an industrial robot through a connection interface 14. On each guide rail 16, 18 two moveable manipulator modules 24 are mounted. The modules 24 can linearly become moved along those rails, what is marked with an arrow with reference sign 34. Actuators 26 can be attached to the base unit 12 to drive this linear movement individually for each manipulator module 20, where a spindle drive (not shown) can be used as a movement transmission interface in between each actuator 26 and each manipulator module 20.

Each manipulator module 20 includes on its first end a moveable flat skid 24 and on its second end a flat tooling interface 22, which can attach a gripping tool 30 thereon. The tool interface 22 is moveable along a circular path 32 around the related skid 24. Since the degree of freedom in movement of the manipulator module 20 is realized by a truss structure in the shape of a tiltable parallelogram, the related two pivots of the tooling interface 22 are moveable, along two circular paths 32 so that the tooling interface is always in parallel to the belonging skid 24.

This circular movement 32 of each tooling interface 22 is driven by an actuator 28, in this case an electric motor. The gripping tool 30 can provide at least one degree of freedom in movement, for example, in the same direction of the axis of rotation of the circular movement 32. As a result, when also including the linear movement of the manipulator module 20 itself, the tool interface 22 can be positioned in any coordinate within a flat virtual movement plane and to adjust the tip of the gripper tool 30 upright to this plane.

Figure 2:
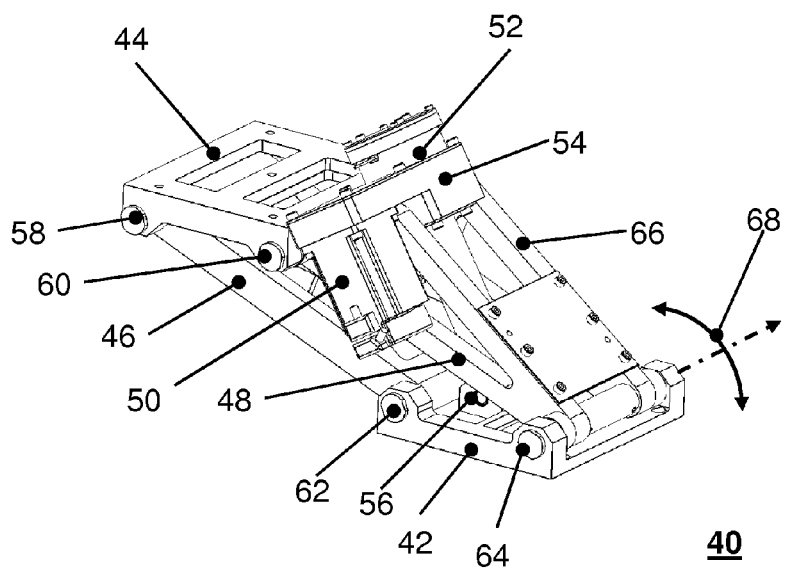
FIG. 2 illustrates a manipulator module in a 3D view in accordance with an exemplary embodiment.

FIG. 2 illustrates a manipulator module in a 3D view in accordance with an exemplary embodiment. FIG. 2 shows a manipulator module 40 in a 3D view, that includes a flat skid 42, which includes slide bearings (not shown) for the moveable connection to a guide rail (not shown), two parallel trusses 46, 48 are pivotably mounted around the bearings 62 and 64. On the opposed sides of the trusses 46 and 48 a flat connection interface 44, which is similar to the tool interface 22 in FIG. 1, is connected to the two bearings 58, 60. The parallelogram shaped truss structure is tiltable around the belonging bearings 60, 62, 64, 66, which is indicated with the arrow 68.

The tilting motion can be driven by the actuator 50, in an exemplary electric motor of the present disclosure, which is mounted on a leverage truss 66 of the truss structure. The transmission interface for the movement of the actuator 50 is a spindle drive 52 with one end connected to a shaft joint 56 on the skid 42. The actuator 50 and the spindle drive 52 are mechanically connected through a coupling module 54 that includes a non visible transmission belt.

Figure 3:
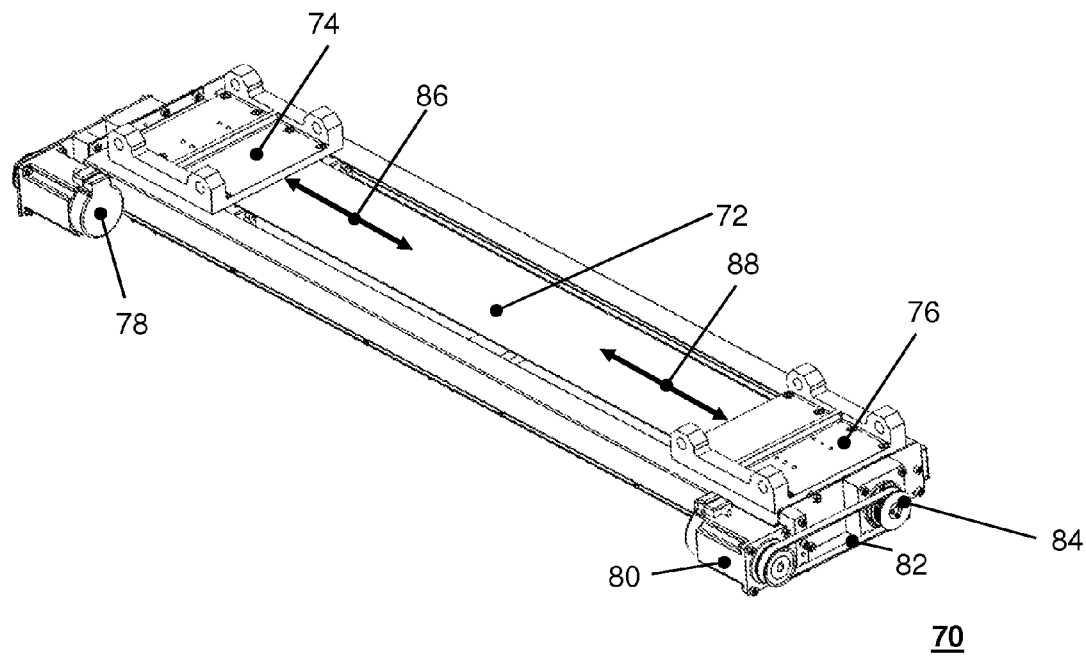
FIG. 3 illustrates an exemplary first guide rail with skids in a 3D view in accordance with an exemplary embodiment.

FIG. 3 illustrates an exemplary first guide rail with skids in a 3D view in accordance with an exemplary embodiment. FIG. 3 shows an exemplary first guide rail 72 with skids 74, 76 in a 3D view 70. The guide rail 72 includes two separate guide notches for the connection to the linear moveable skids 74, 76. The first skid 74 is driven by the actuator 78 and the second skid 76 is independently driven by the actuator 80 having a rotary movement transmitted to the spindle drive 84 with the transmission belt 82. Only one end of the spindle drive 84 is visible, where the spindle extends to the other side of the guide rail 72. A form-locking thread (not shown) which surrounds a cross section of the spindle and which is attached to the second skid 76 converts the rotary movement of the spindle into a linear movement of the skid 76. As a result, it is possible to move both skids 74, 76 independently of each other along the guide rail 72 as indicated with the arrows 86 and 88. The skids 74 and 76 can correspond, for example, to the skid 42 of the manipulator module 40.

Figure 4:
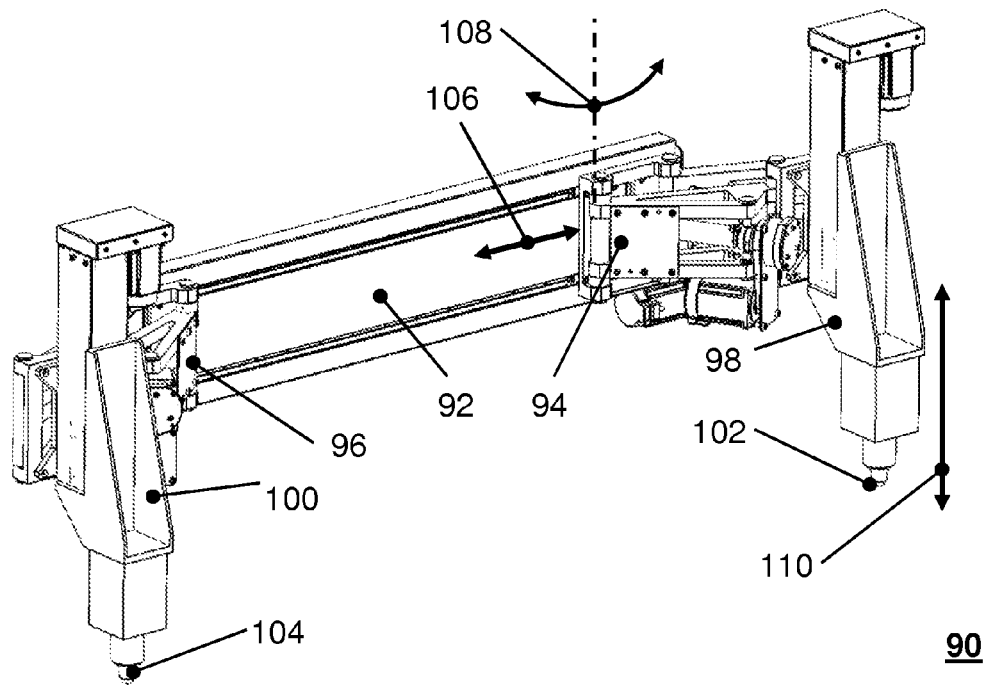
FIG. 4 illustrates an exemplary second guide rail with moveable manipulator modules in a 3D view in accordance with an exemplary embodiment.

FIG. 4 illustrates an exemplary second guide rail with moveable manipulator modules in a 3D view in accordance with an exemplary embodiment. FIG. 4 shows an exemplary second guide rail 92 with two moveable manipulator modules 94 and 96 in a 3D view 90. This arrangement can include a combination of the guide rail 70 shown in FIG. 3 with two manipulator modules 40 according to FIG. 2 mounted thereon and two gripper tools 98 and 100 mounted on the manipulator modules 94 and 96.

The gripper tool 98 which is identical to the gripper tool 100 a counterpart interface to the connection interface of the manipulator module 94. The gripper tool 98 includes an actuator for driving the gripping tip 102 up and down in direction of the arrow 110. In an exemplary embodiment, the gripping tip 102 can be a cone shaped end of a round bar, a suction cup, or a clamping device with an additional actuator. As a result, workpieces such as platforms for cars can be handled with the tooling device and its attached gripper tools. Because of this arrangement the gripping tool 98 can provide more than a single up-/down degree of freedom in movement.

The arrow 108 indicates the degree of freedom in movement of the manipulator module 94 due to its tilting motion and the arrow 106 indicates the degree of freedom in movement due to the linear movement along the guide rail 92. Together with the degree of freedom in movement 110 due to the up and down movement of the gripping tip 102, a total of three degrees of freedom in movement can be provided for the gripping tip 102. It should be understood that the gripping tip 104 can provide comparable performance, and thus movement in relation to gripping tip 104 will not be described in detail.

Figure 5:
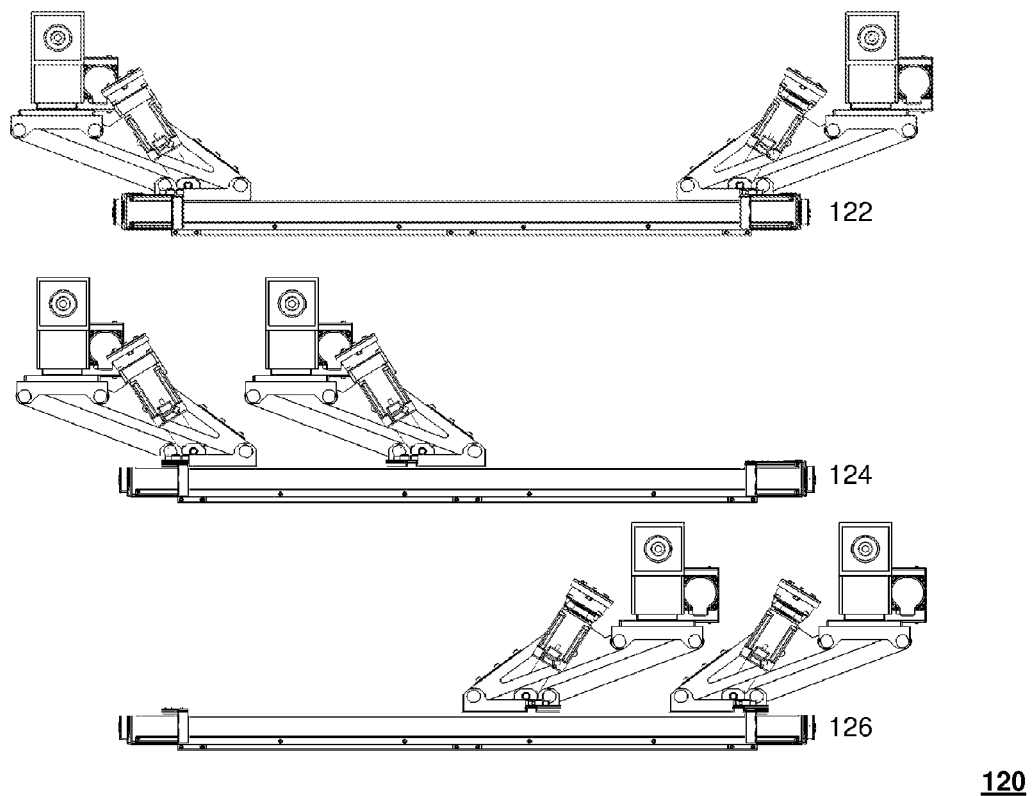
FIG. 5 illustrates an exemplary third guide rail with moveable manipulators in different positions from a top-view in accordance with an exemplary embodiment.

FIG. 5 illustrates an exemplary third guide rail with moveable manipulators in different positions from a top-view in accordance with an exemplary embodiment. FIG. 5 shows an exemplary third guide rail with two moveable manipulators in different positions from a top-view 120. This arrangement is comparable to the arrangement shown in FIG. 4. The several positions indicate the high flexibility and the overlapping working ranges of the tooling device according to the exemplary embodiments of the present disclosure.

In the first position 122, both manipulator modules can be located on opposite sides of the guide rail with different degrees of tilting. In the second position 124, both manipulator modules can be moved to one side of the guide rail where they have the same degree of tilting. In the third position 126, both manipulator modules can be moved to the opposite side of the guide rail with a different degree of tilting.

Figure 6:
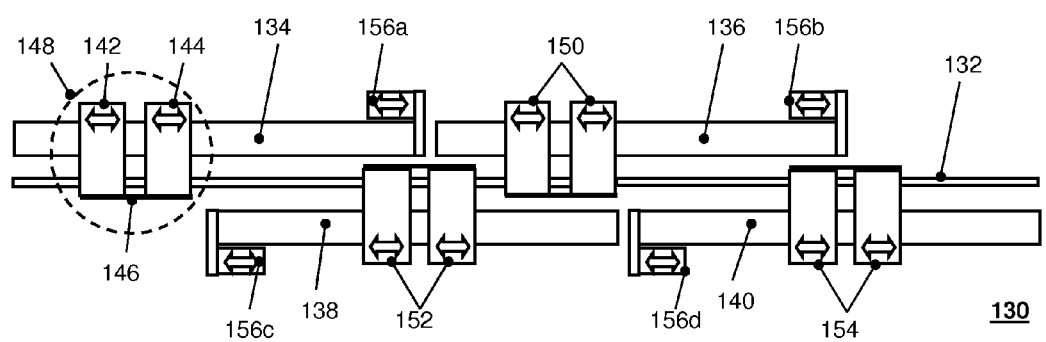
FIG. 6 illustrates a schematic second tooling device from a top-view in accordance with an exemplary embodiment.

FIG. 6 illustrates a schematic second tooling device from a top-view in accordance with an exemplary embodiment. This tooling device includes five parallel guide rails 132, 134, 136, 138, 140. The center rail 132 extends over the whole length of the third tooling device, where the two outer guide rails 134, 136 are arranged in a line on the first side of the center rail 132, and where the two other outer guide rails 138, 140 are arranged in a line on an opposite side of the center rail 132. All outer rails can be provided with one actuator 156a-d each for the linear movement of the skid mounted thereon. In an exemplary embodiment, skid 148 and skid 152 can be mechanically coupled and driven by a common actuator 156a. Given this arrangement, use of actuator 156c would be optional.

A coupled skid 148 is moveably mounted on the first outer rail 134 and in addition on the center rail 132. Due to the mounting on two parallel guide rails the mechanical stability of the guided skid 148 can be increased and it is possible to apply a higher mechanical force with one or more not shown manipulator devices. The coupled skid 148 include two separate skids 142 and 144 which are mechanically coupled over the coupling device 146, through various suitable coupling devices, such as a screw.

In this embodiment, only the separate skid 142 is driven by a non visible spindle drive which is integrated in the first guide rail 134. The second separate skid 144 is not actively driven by a dedicated drive but is driven due to the coupling with the other separate skid 142. The center rail 132 does not include a drive for any of the skids which are moveably mounted thereon. Because of this arrangement, two independently acting manipulator modules mounted on the coupled skid can be moveable along the same rail 134 with a common drive which can cause some loss of flexibility of the second tooling device 130 of certain types.

There are three other comparable coupled skids 150, 152 respectively 154, which can be mounted on a dedicated outer rail 136, 138 respectively 140 and which are all mounted on the same center rail 132.

Due to an offset of the longitudinal extension of opposed outer guide rails 134, 136 on one side and 138, 140 on the opposed side it is in principal possible, that each coupled skid can be moveable along the whole longitudinal extension of its dedicated outer guide rail. Due to the common guidance of all coupled skids on the center rail 132 some restrictions should be observed.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Signs
- 10 first tooling device
- 12 base unit
- 14 connection interface to manipulator
- 16 first guide rail of first tooling device
- 18 second guide rail of first tooling device
- 20 manipulator module of first tooling device
- 22 tool interface of manipulator module
- 24 moveable skid of first manipulator module
- 26 first actuator of first tooling device
- 28 second actuator of first tooling device
- 30 tool of first tooling device
- 32 movement range of manipulator device of first gripper tool
- 34 moving direction of manipulator modules
- 40 manipulator module
- 42 skid of manipulator module
- 44 connection interface of manipulator module
- 46 first truss of manipulator module
- 48 second truss of manipulator module
- 50 actuator of manipulator module
- 52 spindle drive
- 54 coupling module
- 56 shaft joint
- 58 first bearing
- 60 second bearing
- 62 third bearing
- 64 forth bearing
- 66 leverage truss
- 68 rotating direction
- 70 exemplary first guide rail with skids
- 72 first guide rail
- 74 first skid on first guide rail
- 76 second skid on first guide rail
- 78 actuator for first skid on first guide rail
- 80 actuator for second skid on first guide rail
- 82 belt
- 84 spindle drive for second skid
- 86 movement direction of first skid on first rail
- 88 movement direction of second skid on first rail
- 90 exemplary second guide rail with moveable manipulator modules
- 92 second guide rail
- 94 first manipulator module on second guide rail
- 96 second manipulator module on second guide rail
- 98 first tool mounted on second end first manipulator module
- 100 second tool mounted on second end second manipulator module
- 102 gripping tip of first tool
- 104 gripping tip of second tool
- 106 movement direction of first manipulator module on second rail
- 108 rotation movement provided by first manipulator module
- 110 up-down movement direction provided by first tool
- 120 exemplary third guide rails with moveable manipulator modules
- 122, 124, 126 different states
- 130 second tooling device
- 132 center rail
- 134 first rail of second tooling device
- 136 second rail of second tooling device
- 138 first rail of second tooling device
- 140 forth rail of second tooling device
- 142 first skid on third tooling device
- 144 second skid on third tooling device
- 146 coupling device for skids
- 148 first coupled skids
- 150 second coupled skids
- 152 third coupled skids
- 154 forth coupled skids
- 156*a-d* actuators for linear movement

What is claimed is:

1. A tooling device for connecting to a manipulator, comprising:
a base unit having guide rails;
at least two manipulator modules each with a first and a second end, wherein at least one degree of freedom in movement is provided between both ends of each manipulator module through a parallelogram-shaped truss structure directly or indirectly connected to a skid on the first end, the first end of each manipulator module is connected with the base unit through the skid, and the at least one manipulator module is moveable along the guide rail via the skid;
at least one actuator for each manipulator module is configured to drive a tilting motion of the parallelogram-shaped truss structure and realize the at least one degree of freedom for an associated manipulator module, wherein the at least one actuator is mounted on the truss structure and coupled to the skid via a spindle drive; and a tool interface is provided at the second end of each manipulator module, wherein the tool interfaces are moveable independently from each other relative to the base unit;

wherein at least one manipulator module is linearly moveable on its first end relative to the base unit.

2. The tooling device according to claim 1, wherein actuators are provided for linearly moving the manipulator modules and/or for driving movement of the manipulator modules at least one degree of freedom.

3. The tooling device according to claim 1, wherein at least one actuator is linearly moveable relative to the base unit together with an associated manipulator module.

4. The tooling device according to claim 1, wherein at least two manipulator modules are moveable on a separate or coupled skid each on the same guide rail independently from each other.

5. The tooling device according to claim 4, wherein the at least two manipulator modules are mechanically coupled and driven by a common actuator along a common guide rail.

6. The tooling device according to claim 2, wherein at least one actuator is coupled with the skid through the spindle drive and a shaft joint.

7. The tooling device according to claim 1, wherein the at least two tiltable truss structures shaped as a parallelogram are each in a manipulator module, which are mechanically connected.

8. The tooling device according to claim 1, wherein at least two guide rails that are in parallel with at least one related skid are each moveable independently each from each other, wherein the two guide rails overlap at least along a part of their longitudinal extension.

9. The tooling device according to claim 1, wherein at least two guide rails are in parallel with at least a common moveable mounted skid, wherein the two guide rails overlap at least along a part of their longitudinal extension.

10. The tooling device according to claim 9, wherein at least two guiding rails with at least one moveable mounted skid each are nested around a common rail and that at least one skid is in addition moveable mounted on the common rail.

11. The tooling device according to claim 10, wherein at least two skids or pair of coupled skids are coupled together, and the coupled arrangement of skids is driven by one common actuator along associated guide rails.

12. The tooling device according to claim 1, wherein the actual position of the moveable mounted skid on the guide rail and/or the position of a manipulator module and/or the position of a tool interface is obtained with a sensor device.

13. The tooling device according to claim 1, wherein the tooling device is mounted on a robot.

14. The tooling device according to claim 10, wherein movement of the robot and the movement of the tooling device are controlled by the same controlling device.

15. A method for gripping workpieces, wherein a tooling device according to claim 1 is used and manipulator modules are pre-positioned in a pre-tilt position before moving to a final gripping position.

* * * * *